United States Patent Office 2,732,713
Patented Jan. 31, 1956

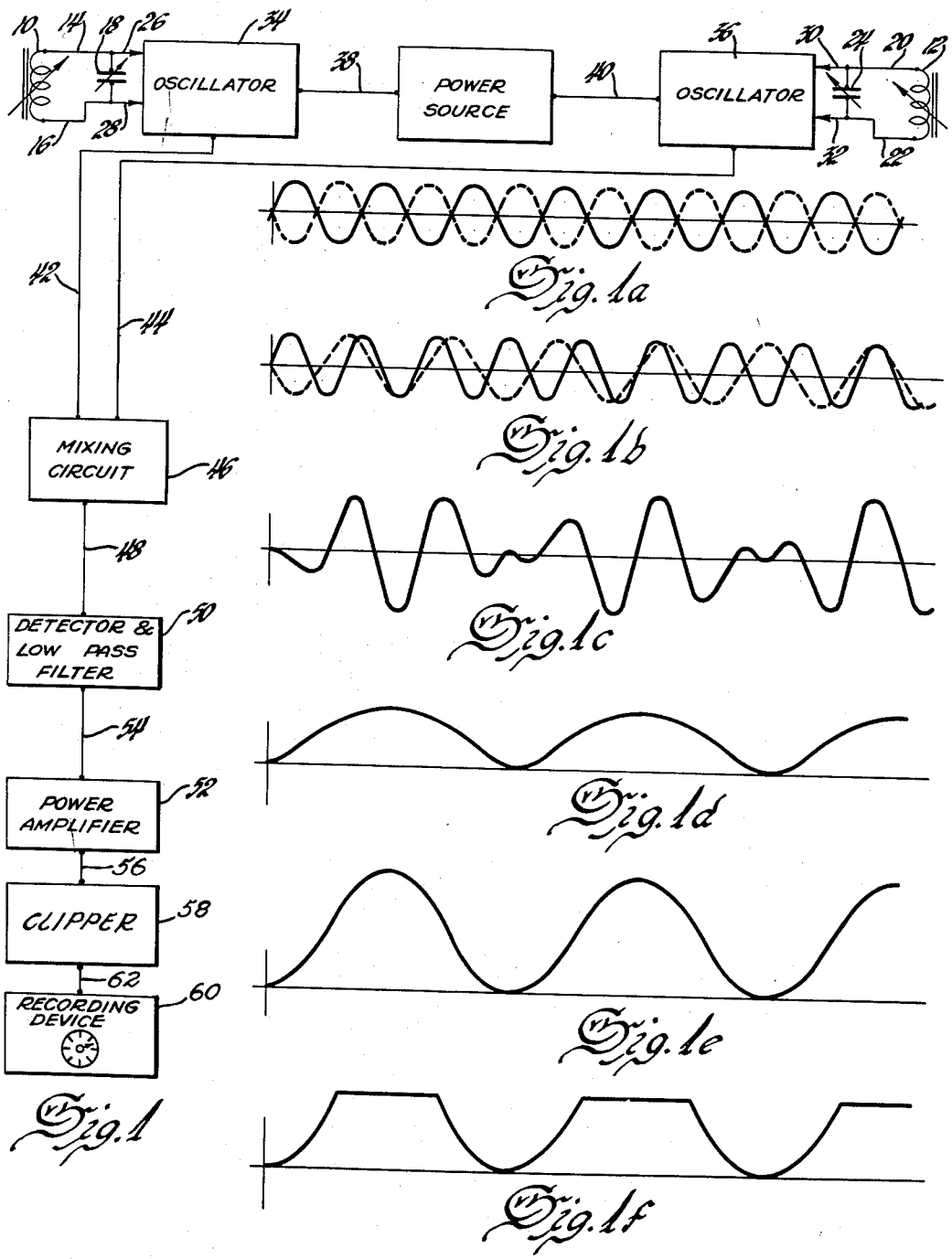

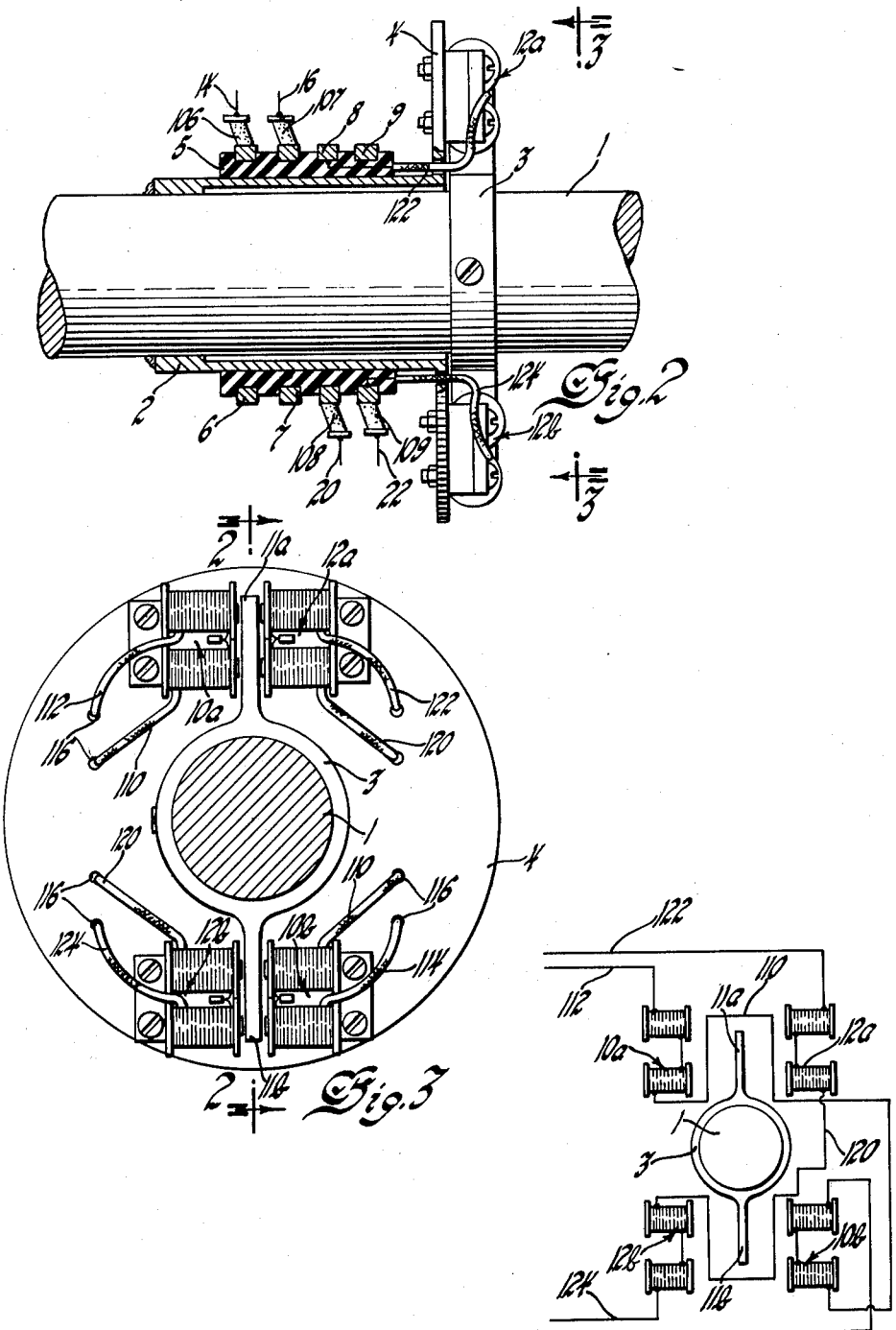

2,732,713

STRAIN-MEASURING DEVICE

Samuel P. Willits, Chicago, Ill., assignor to General Motors Corporation, Detroit, Mich., a corporation of Delaware Application January 6, 1951, Serial No. 204,765

5 Claims. (Cl. 73—136)

This invention relates to measuring devices and particularly to a measuring means whose electrical characteristics will be altered by changes in the mechanical strain characteristics of a member under inspection.

A principal object of the invention is to provide a strain-sensitive means for electrically measuring forces such as torque in a rotating body. The invention comprises oscilliatory circuits including strain-responsive impedances used in conjunction with a mixing circuit and a frequency-measuring means preferably including a power amplifier. The oscillators have fixed and equal frequencies before the application of load to the member under inspection, which frequencies are varied by changes in impedance as the strain in the member is altered so that when the oscillator outputs are fed into the mixing circuit, the difference or "beat" frequency which is produced is a direct measurement of torque. The differential control means thereby provided is considerably more sensitive than a balanced or null method.

A further object of the invention is to provide a torque-measuring apparatus having improved characteristics of sensitivity and dependability. This is accomplished in accordance with the invention by providing a strain-sensitive device embodying a pair of tunable oscillators which hold constant frequencies before measurement rather than a constant amplitude of signal, as was often done in earlier torque meters, the former being much easier to maintain. Inasmuch as only changes in frequency can cause the recording device in the present invention to indicate a different strain, only changes in the frequencies of the oscillators can introduce error in the indicated strain.

Moreover, the present measuring device insures a high degree of accuracy because the comparable parts of the two oscillator circuits are closely associated physically so that ambient temperature variations which tend to alter one oscillator frequency have an almost identical effect on the other oscillator, and the difference frequency is changed only to a negligible extent. As a result, the normal drift of two or three percent in one oscillator, which if uncompensated would produce 20 to 30 percent errors in the difference frequency, is almost completely compensated by a similar drift in the other oscillator.

Other objects and advantages of the invention will more fully appear from the following description of the preferred embodiment of the invention shown in the accompanying drawing, in which:

Figure 1 is a schematic diagram showing the electric circuit embodying the invention;

Figure 1a is a graph of the response curves of the two oscillator signals showing the amplitude of the signals plotted on a time base before the application of torque to the member under inspection, the output of one oscillator being shown as a solid line and the output of the other oscillator being represented by a broken line;

Figure 1b is a graph of the two oscillator signals shown in Figure 1a during torque measurement;

Figure 1c is a graph of amplitude of the resultant signal plotted against time of the composite curve formed by the superimposition in the mixing circuit of the two curves shown in Figure 1b;

Figure 1d is a graph of amplitude of signal versus time, showing the composite curve of Figure 1c after the signal represented thereby has been subjected to the filtering and rectifying action of the detector and low-pass filter shown in Figure 1;

Figure 1e shows the curve representing the signal shown in 1d after it passes through a power amplifier;

Figure 1f is a graph of the signal after being subjected to a clipper;

Figure 2 is a side view taken partly in section and partly in elevation in the direction of 2—2 of Figure 3 of one form of inductance pickup device that may be used in the present invention;

Fig. 3 is a transverse view taken in the direction of 3—3 of Fig. 2; and

Fig. 4 is an electrical wiring diagram of the connections of the inductances of the pickup device of Figs. 2 and 3.

Referring more specifically to the drawing, there are schematically shown in Figure 1 two variable inductance coils 10 and 12 constituting strain-sensitive pickup coils, which are mounted in or upon a rotating member whose physical characteristics are under investigation. The pickup apparatus used in the invention may be of the rotatable type disclosed in Patent No. 2,415,513, issued February 11, 1947, in the names of E. J. Martin, R. N. Frawley and C. E. Grinstead. Another form of known pickup apparatus suitable for use herein is shown in Figs. 2 to 4 wherein 1 is the shaft of a rotating member which is subjected to variable torque producing condition, respectively mounting thereon a sleeve 2 and ring collar 3 which form the two principal parts of the pickup apparatus. One end of the sleeve 2 is rigidly secured, as by welding or otherwise, to the shaft 1 and a circular disk or plate 4 is provided at the other end thereof, the sleeve clearing the shaft except where it is attached at the end opposite the plate. Pressed on the sleeve 2 between the attached and free ends thereof is an insulating sleeve 5 mounting four axially spaced slip rings 6, 7, 8 and 9 each associated with a stationary brush element 106, 107, 108 and 109 respectively.

Mounted near the periphery and spaced at opposite ends of and on opposite sides of a diameter of the plate 4 facing the ring collar 3 are four sets of spaced iron core magnet coils 10a, 10b, and 12a, 12b, substantially as shown. Each set of coils is composed of a pair of serially connected individual coils making a total of eight coils employed.

The two sets of coils 10a and 10b located at opposite ends and on opposite sides of a vertical diameter through the structure shown in Fig. 3 are connected electrically in series by the conductor 110 shown in Fig. 4 and the end terminals 112 and 114 thereof threaded through openings as 116 in the plate and electrically connected to a pair of adjacent slip-rings as 6 and 7 respectively. The coil sets 12a and 12b likewise are serially connected by a conductor 120 and their end terminals 122, 124 threaded through openings in the plate and electrically connected to the remaining pair of slip-rings 8 and 9, respectively.

The ring collar 3 shown spaced slightly from the plate 4 is securely attached to the shaft 1 and is formed with a pair of diametrically spaced tongues or armatures 11a and 11b, which extend into the spaces between the coil sets 10a, 12a and 10b, 12b, respectively. As is evident, a wind-up in the shaft 1 between the points of attachment of the sleeve 2 and ring collar 3 varies the air gaps in the magnetic circuits of the four sets of coils in such manner as to diminish the air gap associated with the two sets of coils as 10a and 10b, collectively designated as 10 hereinafter, and to increase the air gap associated with the two sets of coils 12a and 12b, collectively designated as 12 hereinafter. The particular coil mounting arrangement illustrated and the use of two sets of coils for each of the inductance units 10 and 12 serves to eliminate the effect of stresses due to shaft flexure and to provide sufficient inductance values to assure sensitivity of operation.

The inductance 10 is connected in parallel by lead wires 14 and 16 from slip rings on the rotatable pickup to a variable capacitance 18, which is preferably not mounted on the pickup means. Similarly, leads 20 and 22 connect inductance 12 to a variable capacitance 24. These capacitances 18 and 24 are in turn electrically connected, as shown in Figure 1, by lead wires 26, 28, 30 and 32 into the oscillator input circuits, for example, for tuning the oscillators 34 and 36, respectively, to the desired frequency so that the oscillators have equal frequencies before the measurement of torque.

The two oscillators 34 and 36 are high frequency, constant amplitude oscillators which are connected by leads 38 and 40, respectively, to a suitable power source as shown in the drawing. The outputs of the oscillators are fed by lead wires 42 and 44 into a mixing circuit, indicated schematically at 46. These oscillatory circuits are so designed that the capacitances 18 and 24 may be tuned to balance these circuits to a given frequency before torque application. Therefore, any variations in the inductances 10 and 12 in the strain-sensitive pickup coils due to circumferential or torsional distortion of the rotatable member will cause the frequencies of the two oscillators to vary in opposite directions; that is, as the torque or twisting in the member under inspection increases, the frequency of one oscillator will increase and that of the other oscillator will decrease. The initially equal frequencies of the oscillators hence are varied by the changes in the inductances and, when the oscillator outputs are fed into the mixing circuit, produce a "beat" or difference frequency as a direct measurement of torque.

The curves of Figure 1a show the amplitude and frequencies of the two oscillator signals to be equal when no torque is applied to the rotatable member under inspection, one signal being shown in broken lines and the other with solid lines. For purposes of clarification, these oscillator signals are shown as being 180 degrees out of phase. The superimposition of the curves, resulting from these oscillator outputs being fed into the mixing circuit 46 does not create a difference frequency, thus indicating the absence of torque.

After the application of torque, the frequency of one of the oscillator signals will increase while the frequency of the other oscillator signal will decrease, as previously explained, because of the changes in impedances due to variations in the inductances. This will result in the types of curves shown in Figure 1b, these curves representing the signals now produced by oscillators 34 and 36, respectively, before being fed into the mixing circuit. As before, one oscillator output is represented by solid lines and the other by broken lines. The composite curve resulting from the superimposition of the two wave forms in the mixing circuit 46 will be of a type shown in Figure 1c, showing the creation of a "beat" or difference frequency.

Shown as connected to the mixing circuit by lead wire 48 is a detector and low-pass filter 50, which in turn may be electrically connected directly to a power amplifier 52 by lead 54. The filter element filters out higher frequencies while the detector, functioning as a full-wave rectifier, changes the alternating current signals into direct current. The output of the power amplifier is supplied through lead 56 to a clipper or amplitude limiter circuit 58 to permit easier and more exact readings. An indicator or recording device 60, preferably of an integrating type, is shown as connected to the clipper circuit 58 by a lead wire 62. The inclusion in the circuit of a clipper results in the action shown in the curve of Figure 1f.

As indicated above, the device is therefore so arranged that changes in the torsional strain of a rotating shaft or other member under inspection vary the inductances of the pickup coils, thereby simultaneously increasing the frequency of one oscillator signal and decreasing the frequency of the other oscillator signal. The resultant signal, after passing through the mixing circuit, the detector and low-pass filter, and the power amplifier and the clipper, enters a suitable frequency-measuring apparatus, such as the recording device 60. This recording device shown in Figure 1, as hereinbefore noted, is preferably of the type which indicates total cycles through the use of an integrating mechanism rather than merely registering instantaneous measurements, thus providing an "integrating strain gauge" for measuring the average strain in the gauged member during any desired period of time. In its simplest form such a device could be a simple counter wherein a number wheel is advanced one count for each electrical impulse applied. The count is taken for a definite period of time and the number of counts per second determined as an indication of the average strain or torque. A suitable low frequency recorder of this type is the impulse type counter manufactured by the Central Scientific Company, identified as catalog #73506 and illustrated on page 1041 of the CENCO catalog J-150. For higher frequency or pulse repetition rates, an electronic form of counter of the type used in connection with Geiger tubes, for example, could be employed.

Inasmuch as oscillators having very high frequencies are preferably used, slight variations in torque will provide relatively large changes in oscillator frequencies, thus providing a highly sensitive instrument. It will also be noted that, because the difference frequency varies directly with the torsional strain to be measured, the smaller the torque the lower is the difference frequency. This arrangement, therefore, provides very high sensitivity when the amount of strain being measured is small, a feature which is highly desirable in many instances where small torques are being measured.

While the described embodiment of the present invention constitutes a preferred form, it is to be understood that other forms might be adopted, all coming within the scope of the following claims.

I claim:

1. Apparatus for measuring the time integrated average torque produced in a rotatable member comprising, in combination, rotatable pickup means adapted for mounting on said member and comprising a pair of inductances variable in opposite senses in response to the torque to be measured, a pair of signal oscillators each including a different one of said variable inductances for controlling the signal frequency thereof, mixing means connected to said oscillators for beating said oscillator signals together and deriving a beat frequency signal corresponding to the difference frequency therebetween, and recording means responsive to said beat frequency signal connected to said mixing means, said recording means including counting means for recording the total number of cyclical variations of said beat frequency signal over a period of time as a function of the average torque produced in said member.

2. Apparatus for measuring the time integrated average torque produced in a rotatable member comprising, in combination, rotatable pickup means adapted for mounting on said member and comprising a pair of inductances variable in opposite senses in response to the torque to be measured, a pair of signal oscillators each including a different one of said variable inductances for controlling the signal frequency thereof, said oscillators having normally identical frequencies which are varied in opposite directions in response to corresponding changes in said variable inductances produced by torque in said rotatable member, a mixing circuit connected to said oscillators for beating said oscillator signals together, a detector followed by a low-pass filter connected to said mixing circuit for deriving a beat frequency signal corresponding to the difference frequency between said oscillator signals, and recording means responsive to said beat frequency signal connected to said low-pass filter, said recording means including counting means for recording the total number of cyclical variations of said beat frequency signal over a period of time as a function of the average torque produced in said member.

3. Apparatus for measuring the time integrated average torque in a rotatable member comprising, in combination, rotatable pickup means adapted for mounting on said rotatable member and comprising a pair of inductances variable in opposite senses in response to the torque to be measured, a pair of signal oscillators each including a different one of said variable inductances for controlling the signal frequency thereof, a mixing circuit connected to receive said oscillator signals, a detector and low-pass filter connected to said mixing circuit for deriving a resultant beat frequency signal corresponding to the difference frequency of said oscillators, a clipping circuit connected to said low-pass filter for clipping the amplitude of said beat frequency signal, and an impulse counter connected to said clipping circuit for recording the total number of cyclical variations of said clipped beat frequency signal over a period of time as a function of the average torque.

4. Apparatus for measuring the time integrated average strain produced in a member subjected to a fluctuating strain producing condition comprising, in combination, strain responsive pick-up means adapted for mounting on said member and including a pair of impedances at least one of which is variable in response to the strain to be measured, a pair of signal oscillators each including a different one of said impedances for controlling the signal frequency thereof, the output signal frequency of each of said oscillators being equal to each other in the absence of strain in said member and being adapted to change by an amount corresponding to the relative change in impedance of said pickup means produced by strain in the member, mixing means connected to said oscillators for deriving a beat frequency signal corresponding to the difference frequency between said oscillator signals, and recording means responsive to said beat frequency signal connected to said mixing means, said recording means including totalizing means for recording the total number of cyclical variations of said beat frequency signal over a period of time as a function of the average strain produced in said member.

5. Apparatus for measuring the time integrated average torque produced in a rotatable member subjected to variable rotational speeds and fluctuating load conditions comprising, in combination, rotatable pickup means adapted for mounting on said rotatable member and including a pair of inductances variable in opposite senses in response to the torque to be measured, a pair of signal oscillators each including a different one of said variable inductances for controlling the signal frequency thereof, said oscillators having normally identical frequencies which are varied equally in opposite directions in response to corresponding changes in said variable inductances produced by load fluctuations in said rotatable member, a mixing circuit connected to said oscillators, a detector followed by a low-pass filter connected to said mixing circuit and deriving a resultant beat frequency signal corresponding to the difference frequency of said oscillators, a clipping circuit connected to said low-pass filter and an impulse counter connected to said clipping circuit for recording the total number of cyclical variations of said beat frequency signal over a period of time as a function of the average torque.

References Cited in the file of this patent

UNITED STATES PATENTS

| | | |
|---|---|---|
| 2,017,859 | Halstead | Oct. 22, 1935 |
| 2,306,137 | Pabst et al. | Dec. 22, 1942 |
| 2,319,940 | Marrison | May 25, 1943 |
| 2,337,328 | Hathaway | Dec. 21, 1943 |
| 2,382,847 | Baumann | Aug. 14, 1945 |
| 2,415,513 | Martin et al. | Feb. 11, 1947 |
| 2,498,282 | Langer | Feb. 21, 1950 |
| 2,557,393 | Rifenbergh | June 19, 1951 |
| 2,662,408 | Ellison | Dec. 15, 1953 |

FOREIGN PATENTS

| | | |
|---|---|---|
| 436,157 | Germany | Oct. 25, 1926 |